United States Patent
Schulz et al.

(10) Patent No.: US 10,633,528 B2
(45) Date of Patent: Apr. 28, 2020

(54) LIGHT DIFFUSING STYRENE COPOLYMER COMPOSITIONS

(71) Applicant: INEOS STYROLUTION GROUP GMBH, Franfurt am Main (DE)

(72) Inventors: Tobias Schulz, Cologne (DE); Eike Jahnke, Aubonne (CH); Ricardo Daniel Fajardo Figueroa, Frankfurt am Main (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 0 days.

(21) Appl. No.: 15/536,749

(22) PCT Filed: Dec. 15, 2015

(86) PCT No.: PCT/EP2015/079780
§ 371 (c)(1),
(2) Date: Jun. 16, 2017

(87) PCT Pub. No.: WO2016/096848
PCT Pub. Date: Jun. 23, 2016

(65) Prior Publication Data
US 2017/0362422 A1    Dec. 21, 2017

(30) Foreign Application Priority Data
Dec. 19, 2014   (EP) .................................... 14199186

(51) Int. Cl.
C08L 25/14    (2006.01)
C08L 25/12    (2006.01)
G02B 5/02     (2006.01)

(52) U.S. Cl.
CPC ............... C08L 25/14 (2013.01); C08L 25/12 (2013.01); G02B 5/0242 (2013.01); *C08L 2205/025* (2013.01)

(58) Field of Classification Search
CPC combination set(s) only.
See application file for complete search history.

(56) References Cited

U.S. PATENT DOCUMENTS

| | | | |
|---|---|---|---|
| 4,045,514 A * | 8/1977 | Iwahashi ................. | C08L 25/14 525/146 |
| 5,696,187 A | 12/1997 | Kokuzawa et al. | |
| 6,268,961 B1 * | 7/2001 | Nevitt .................. | G02B 5/0226 349/84 |
| 7,982,826 B2 * | 7/2011 | Hirakata ................ | G02B 1/105 349/112 |
| 8,040,461 B2 * | 10/2011 | Lin .................... | G02F 1/133611 349/56 |
| 2002/0024158 A1 * | 2/2002 | Nishigaki ............ | B29C 45/0001 264/1.1 |
| 2006/0100322 A1 | 5/2006 | Kang et al. | |
| 2008/0299393 A1 | 12/2008 | Wu et al. | |
| 2009/0067190 A1 * | 3/2009 | Funabashi ................ | B32B 7/02 362/558 |
| 2009/0080079 A1 | 3/2009 | Kogure et al. | |
| 2009/0239985 A1 | 9/2009 | Toyama et al. | |
| 2010/0002436 A1 * | 1/2010 | Seo .......................... | G02B 1/12 362/246 |
| 2013/0317175 A1 * | 11/2013 | Guo ...................... | C08F 265/06 525/185 |
| 2013/0331474 A1 * | 12/2013 | Kida ........................ | C08K 3/22 522/39 |

FOREIGN PATENT DOCUMENTS

| | | | | |
|---|---|---|---|---|
| CN | 103193915 A | 7/2013 | | |
| EP | 0634445 A1 | 1/1995 | | |
| JP | 04134440 A * | 5/1992 | | |
| JP | 6-220290 A | 8/1994 | | |
| JP | 2009-215476 A | 9/2009 | | |
| JP | 2012-214669 A | 11/2012 | | |
| KR | 20080105477 A | 12/2008 | | |
| KR | 20090054913 A | 6/2009 | | |
| TW | 201026766 A | 7/2010 | | |
| WO | 2006062171 A1 | 6/2006 | | |
| WO | WO-2006057355 A1 * | 6/2006 | ............. | B32B 27/08 |
| WO | WO-2014025657 A1 * | 2/2014 | ....... | B29D 11/00798 |

OTHER PUBLICATIONS

Machine translation of WO 2006/057355 A1, retrieved Oct. 2018. (Year: 2018).*
Database WPI Week 200645 Thomson Scientific, London, GB; AN 2006-445308 XP002754945, Jun. 1, 2006, Abstract.

* cited by examiner

*Primary Examiner* — Nicole M. Buie-Hatcher
(74) *Attorney, Agent, or Firm* — J.A. Lindeman & Co. PLLC

(57) ABSTRACT

The invention relates to a styrene copolymer composition comprising a) 60 to 99.9% by weight of styrene-based polymer matrix component A, b) 0.1 to 5% by weight of PMMA-based, cross-linked polymer bead as light diffuser component B, wherein the polymer beads have an average particle diameter from 0.5 to 20 μm and a refractive index ranging from 1.34 to 1.55, and c) 0 to 39.9% by weight of further component C, different to A and B, wherein the sum of components A) to C) is 100% by weight and the composition exhibits a light transmittance greater than 80%, a haze greater than 90% and a Yellowness Index less than 4.5.

13 Claims, No Drawings

LIGHT DIFFUSING STYRENE COPOLYMER COMPOSITIONS

The invention relates to a light diffusing styrene copolymer compositions comprising a styrene based polymer forming a matrix (component A), and poly (methyl methacrylate) based, cross-linked polymer beads (PMMA) acting as light diffuser (component B). These compositions, due to the specific components, are exhibiting a light transmittance of greater than 80%, a haze of greater than 90%, and a Yellowness Index of less than 4.5.

BACKGROUND

Different transparent and light diffusing styrene copolymer compositions are known in the prior art. Thermoplastic polymer compositions comprising small polymer particles, formed in a variety of shapes and sizes (polymer beads) are also known.

US 2006/0100322 relates to a light diffusion resin composition, which is prepared by adding a bead type light diffusion resin comprised of PMMA as a light diffuser to a polyethylene terephthalate (PET) polyester resin. The light diffusion resin composition can be readily molded into a cover for lightings or sign boards by a processing method.

US-A 2009/0239985 discloses a rubber-modified styrene-based resin comprising a styrene-based polymer forming a matrix wherein rubber-like polymer particles are dispersed into like islands. However, the molding compositions of US 2009/0239985 show high yellow indices and low transmittance.

In KR 2008/0105477 and KR 2009/0054913 resins comprising a diffusion agent and a ter-polymer containing methyl methacrylate and styrene are disclosed. The diffusion agent may be a siloxane-based polymer, an acrylic polymer, or calcium carbonate. The optical transmittance of the resins is less than 62%.

Diffusion beads with a core-shell structure are described in US 2008/0299393. The core-shell structure consists of organic and inorganic material. A coated PET sheet is disclosed.

In JP-H06 220290 (Sekisui Plastics, 1994) a cross-linked methyl methacrylate polymer for the use as light-diffuser in a polymethyl methacrylate resin is described. The average particle diameter of the light-diffuser is between 1 and 30 micro meter (µm).

JP-A 2012/2146689 relates to light diffusing resin, comprising a basis resins such as polycarbonate, polymer particles such as cross-linked (meth)acrylic resins, an organic acid metal salt compound and a fluoropolymer.

EP-A 0634445 discloses a light diffuser composition containing inorganic particles and polymeric particles having a core-shell morphology. A light diffuser having a core of poly(butyl acrylate) and a shell of poly(methyl methacrylate) is tested. Polycarbonate compositions comprising these core-shell particles and optionally titanium dioxide are shown.

CN-A 103193915 relates to a light diffusing agent, a PMMA light diffusing plate and a manufacturing method thereof. The light diffusing plate comprises 0.5-3.0% by weight of light diffusing agent and 97.0-99.5% by weight of polymethyl methacrylate. The light diffusing agent is a random copolymer of styrene and methacryloxy-propyl-isobutyl polyhedral oligomer silsesquioxane.

In TW-A 2010/26766 a styrene-based resin composition is described, which contains a cross-linked resin particulate comprised of a (meth)acrylic acid ester system having a volume-average particle diameter (dv) of 0.7-2.5 µm and a ratio (dv/dn) of the volume-average particle diameter (dv) to the number-average particle diameter (dn) of 1.2 or less, wherein the charge crosslinking point equivalent weight is at least 0.15 meq/g and. The cross-linked resins comprise B(a) and B(b), wherein B(b) contains hydrolyzable silyl groups. The yellow indices of the resins according to the examples of TW 201026766 are greater than 8.2.

A styrene-based resin for light diffusion plates and a method for producing the same are disclosed in JP-A 2009/215476. The light diffusing agent is a blend of polymethyl methacrylate and a styrene-based resin. A methanol soluble content is used.

US 2009/0080079 discloses a light-diffusive aromatic polycarbonate-based resin composition. The composition contains a light-diffusing agent, which may be based on a silicone resin and styrene-(meth)acrylic ester copolymers.

U.S. Pat. No. 5,696,187 proposes a styrene methyl methacrylate (SMMA) copolymer resin composition, further comprising lithium sulfonate having a $C_{8-16}$ alkyl group and inorganic glass beads as a light diffuser. The glass beads may optionally be coated with wax to avoid agglomeration of the glass beads in the resin.

Various applications, such as luminaires for LEDs or light diffusion sheets for flat screen or outdoor applications such as ship lightings, require materials with high light transmittance, high wide angle scattering (haze) and a low Yellowness Index (YI). So far, no satisfactory styrene-based compositions having these features are known. Ideally, the material should be stable and not sensitive towards hydrolysis. Especially for an application as luminaire materials for LEDs spatial scattering behavior is an important property, which may be quantified with diffusion factor.

One objective of the present invention is to provide a material with high light transmittance, high wide angle scattering (haze), low Yellowness Index (YI), and a tunable diffusion factor (OF). Furthermore, the use of bis-phenol A (BPA) should be avoided, which e.g. is often used in polycarbonate compositions.

It now was found that styrene-based composition can be used in extrusion or injection molding processes to produce the desired molding compositions comprising a styrene-based polymer and PMMA-based, cross-linked polymer beads. Surprisingly, it has further been found that the copolymer compositions of the present invention also bear a beneficial weather resistance.

DESCRIPTION

The present invention relates to a styrene copolymer composition comprising, or consisting of:
a) 60 to 99.9% by weight of at least one styrene copolymer as matrix component A,
b) 0.1 to 5% by weight of at least one type of PMMA-based, cross-linked copolymer beads as light diffuser component B, wherein the polymer beads have an average particle diameter from 0.5 to 20 µm and a refractive index ranging from 1.34 to 1.55, and
c) 0 to 39.9% by weight of at least one further component C, which is different to A and B,
wherein the sum of components A to C is 100% by weight. This styrene copolymer composition should exhibit a light transmittance (determined by ASTM D1003) of greater than 60%, in particular greater than 80%, a haze (determined by ASTM D1003-95) of greater than 90% and a Yellowness Index (determined by ASTM E313) of less than 4.5.

As used herein, ASTM D1003 is preferably used in the version ASTM D1003-95. The other standard protocols are used in the newest version up-to-date on Dec. 19, 2014, such as, e.g., DIN EN ISO 4892-3:2014-02, ASTM D1238-13, ASTM E313-10, etc.

The person skilled in the art will note that the average particle diameter as used herein refers to the volume-average particle diameter (dv). The particle size distribution can, exemplarily, be determined by means of a COULTER Multisizer as experimentally depicted below.

Often, the composition comprises 0.1 to 19.8% by weight of at least one further component C. In case of the presence of an inorganic filler component C, this styrene copolymer composition should exhibit a light transmittance (determined by ASTM D1003) of greater than 60%.

The present invention in particular relates to a styrene copolymer composition, wherein the matrix component A is based on a styrene acrylonitrile copolymer (SAN), a styrene methyl methacrylate (SMMA), or a mixture thereof.

In one embodiment, the component A is a SAN with a molecular weight Mw from 90.000 to 270.00 g/mol (measured via GPC). The SAN preferably has an acrylonitrile content of 19 to 33% by weight in the copolymer.

In one embodiment, the component A is a styrene methyl methacrylate resin (SMMA) with a molecular weight Mw from 100.000 to 250.00 g/mol (measured via GPC).

Often, a SMMA-product NAS® 30 purchased from Styrolution (Frankfurt, Germany) is used, having a Mw of 190 kDa (determined by GPC with UV-detector), a polydispersity index (PDI) of 2.6 and a light transmission of 91% (determined by ASTM D 1003 at 550 nm).

In one embodiment, the styrene copolymer composition comprises, or consists of:
a) 80 to 99.1% (often about 94 to 99.1%) by weight of at least one styrene copolymer as matrix component A,
b) 0.1 to 1% by weight of at least one type of PMMA-based, cross-linked copolymer beads as light diffuser component B, wherein the polymer beads have an average particle diameter from 0.5 to 20 μm and a refractive index ranging from 1.34 to 1.55, and
c) 0 to 19.8% by weight, in particular 0.1 to 19.8%, often 0.1 to 5% by weight of at least one further component C, which is different to A and B.

The present invention in particular relates to a styrene copolymer composition, comprising 0.1 to 2%, often 0.2 to 1.8% by weight, based on the weight of all components A to C, of at least one light diffuser component B.

The present invention in particular relates to a styrene copolymer composition, wherein the light diffuser component B is prepared from at least 80%, often at least 90% by weight of methyl methacrylate (MMA).

The present invention in particular relates to a styrene copolymer composition, wherein the polymer beads of component B have an average particle diameter between 0.8 and 12 μm, often from 0.8 to 10 μm.

The present invention in particular relates to a styrene copolymer composition, wherein at least two different types of light diffuser beads are used as light diffuser component B. Preferably, in the styrene copolymer composition, the at least two different types of light diffuser beads have a different average particle diameters and are used as light diffuser component B.

The present invention in particular relates to a styrene copolymer composition, wherein the first type light diffuser beads B1 have an average particle diameter from 0.8 to 5 μm, the second type light diffuser beads B2 have an average particle diameter from 5.1 to 10 μm. Optionally a further type of light diffuser beads B3 is used, having an average particle diameter different to B1 and B2.

The present invention in particular relates to a styrene copolymer composition, wherein at least two different light diffuser beads with a different refractive index are used as light diffuser component B.

The present invention in particular relates to a styrene copolymer composition, wherein one type of light diffuser beads B1' has a refractive index from 1.34 to 1.45, a second type of light diffuser beads B2' has a refractive index from 1.46 to 1.55. Optionally, a further type of light diffuser beads B3' is used that has a refractive indices different to B1' and B2'.

The present invention in particular relates to a styrene copolymer composition, wherein at least two different types of light diffuser beads B with different average particle diameters and different refractive indices are used.

The present invention in particular relates to a styrene copolymer composition, wherein the light transmittance of the styrene copolymer compositing is greater than or equal to 83% and/or the haze is greater than or equal to 93%.

The invention also relates to a process for the preparation of a styrene copolymer composition, comprising:
a) 60 to 99.9% by weight of at least one styrene copolymer matrix component A,
b) 0.1 to 5% by weight of at least one PMMA-based, cross-linked copolymer bead as light diffuser component B, wherein the polymer beads have an average particle diameter from 0.5 to 20 μm and a refractive index ranging from 1.34 to 1.55, and
c) 0 to 39.9% by weight of at least one further component C which is different to A and B, wherein the sum of components A) to C) is 100% by weight
which process comprises the steps of:
(i) dispersing component B or a master batch comprising component B in the matrix component A and optionally adding component C, and
(ii) heat treatment with a temperature of 150 to 250° C., and
(iii) cooling the styrene copolymer composition below the glass transition temperature (Tg) of the composition.

This process preferably is applied for styrene copolymer compositions described above more in detail.

The invention also relates to the use of a styrene copolymer composition as described above or of a styrene copolymer composition obtained by the process as described above for the manufacturing of a light diffusing plate, molding, or foil.

The invention also relates to a light diffusing plate, molding, or foil obtained from a styrene copolymer composition as described above or from a styrene copolymer composition obtained by a process as described above The styrene copolymer composition according to the invention exhibits preferably a diffusion factor (DF) of more than 4%, preferably of 4 to 60%, and even more preferably of 4 to 40%, measured with a conoscope (such as EZContrast XL88).

The styrene copolymer composition according to the invention exhibits preferably a diffusion factor (DF) of more than 10% by weight, preferably more than 15% by weight to compensate hot spot of exemplarily LEDs and a DF of less than 25% by weight, preferably less than 20% by weight for light guide applications.

Furthermore, the styrene copolymer composition according to the invention exhibits preferably an eccentricity (determined with a conoscope, such as EZContrast XL88) less than 1.5, more preferably less than 1.25, and even more preferably less than 1.12. The eccentricity is the deviation from an ideal circular angular ((p) intensity distribution which is expressed with the ration of the two major axes. According to this definition a circle would be represented by an eccentricity of 1.00.

In another preferred embodiment, the invention relates to a styrene copolymer composition as described above, wherein component A and/or component B comprise at least one UV stabilizer.

In another preferred embodiment of the present invention, the copolymer composition of the present invention comprises at least 0.01%, more preferably at least 0.05%, even more preferably between 0.05 and 5%, even more preferably between 0.1 and 1%, in particular between 0.1 and 0.3% by weight such as, exemplarily, (about) 0.2% by weight (related to the sum of component A, B and C) of at least one UV stabilizer as component C.

In a more preferred embodiment of the present invention, the copolymer composition comprising the at least one UV stabilizer (exemplarily in the amounts as indicated above) bears, after weathering for 26 h according to ISO 4892-3:
a) an alteration of the yellowness index ($\Delta$YI) of not more than 20, preferably of not more than 10, more preferably of not more than 5, even more preferably of not more than 0 (i.e., no yellowing), in particular a blueing (i.e., a negative alteration of the yellowness index) such as of between 0 and −20; and/or
b) an alteration of the color shift ($\Delta$E) of not more than 20, preferably of not more than 10, in particular of not more than 5,
wherein said differences ($\Delta$) indicate the differences between the copolymer weathered for 26 h according to ISO 4892-3 as described above in comparison to the same copolymer immediately prepared, i.e., not wethered.

In the following, the various types of components to be used in the compositions and in the process of preparation of the thermoplastic molding compositions are described in more detail.

Component A

Component A is the matrix of the styrene copolymer composition and is at least one styrene copolymer, which may in principle be any thermoplastic styrene copolymer known in the art.

The (matrix) component A is present in the styrene copolymer composition in an amount of 50 to 99.95% by weight, preferably of 60 to 99.9% by weight, more preferably of 70 to 99.1% by weight, even more preferably of 80 to 99.1% by weight, an in particular of 85 to 99.5% by weight, based on the weight of all components A to C of the styrene copolymer composition.

The styrene copolymer (component A) usable in the polymer blend according to the present invention may be any styrene copolymer known in the art. As used herein, the term "at least one styrene copolymer" indicates that there may optionally be only one type or different types of styrene copolymer(s) in the polymer blend of the present invention. Such different types of styrene copolymers may, exemplarily, have different molecular weights, different melt flow indices (MFIs) and/or different co-monomers.

A single type of styrene copolymer may be styrene copolymer bearing essentially the same monomer moieties, i.e., contents of each monomer moiety+/−10%, a molecular weight (Mw) range of +/−10%, a melt flow index (MFI) determined at a temperature of 200° C. and at a load of 5 kg according to ASTM procedure D1238 of +/−1 g/10 min and an essentially comparable monomer moiety composition and distribution over the polymer strand. Different types of styrene copolymer may vary in at least one of the aforementioned characteristics.

As throughout the invention, the term "molecular weight" (Mw) may be understood in the broadest sense as the mass of a molecule or a section of a molecule (e.g., a polymer strand, a polymer block or a small molecule) provided in g/mol (Da) and kg/mol (kDa), respectively. Preferably, the molecular weight (Mw) may be the average weight in the population of molecules observed, i.e., the overall average of the molecular weight (Mw) of the molecules characterized by a certain Mw. The Mw is measured by known to the art methods.

Component A may be a copolymer of at least one vinylaromatic monomer and at least one aliphatic vinyl compound(s). Vinylaromatic monomers are selected, but not limited to, from styrene, $\alpha$-methylstyrene, and mixtures thereof. Aliphatic vinyl compounds are selected, but not limited to, from $\alpha,\beta$-unsaturated methyl (meth)acrylate, methyl (meth)acrylic acid, and acrylonitrile.

In a preferred embodiment, component A is a copolymer prepared by anionic or cationic polymerization of ($\alpha$-methyl)styrene and acrylonitrile. Preferably, component A is a styrene acrylonitrile copolymer (SAN), which is obtained by emulsion, suspension, solution, or mass polymerization. Also mixtures of SAN-copolymers as described in Ulmann's Encyclopedia of Industrial Chemistry (VCH-Verlag, 5. Ausgabe, 1992, S. 633 f.) are suitable.

In a preferred embodiment, component A comprises 60 to 85% by weight, preferably from 65 to 75% by weight, based on the weight of component A, of at least one vinylaromatic monomer (e.g. styrene) and 15 to 40% by weight, preferably 25 to 35% by weight, based on the weight of component A, of an aliphatic vinyl monomer (e.g. acrylonitrile).

Vinyl aromatic monomers may exemplarily be styrene and styrene derivatives, such as $\alpha$-methylstyrene and core alkylated styrenes, such as p-methylstyrene and/or tert.-butylstyrene. Preferably, styrene and $\alpha$-methylstyrene are used.

Aliphatic vinyl monomers may be $\alpha,\beta$-unsaturated components, preferably acrylonitrile and/or methacrylonitrile. In particular acrylonitrile is used.

Preferably, component A comprises 65 to 75% by weight, based on the weight of component A, of styrene or $\alpha$-methylstyrene and 25 to 35% by weight, based on the weight of component A, of acrylonitrile.

Preferably, the styrene copolymer is prepared from two or three monomers selected from styrene, acrylonitrile, and/or $\alpha$-methylstyrene via mass polymerization or in the presence of a solvent. The range of the weight-average molecular weight (Mw) of component A is preferably in the range from 50,000 to 400,000 (g/mol), more preferably in the range from 80,000 to 300,000 (g/mol), and even more preferably in the range from 100,000 to 250,000 (g/mol), wherein the weight-average molecular weight (Mw) is exemplarily detected by light scattering in tetrahydrofuran (GPC with UV-detector).

Further, component A may be a copolymer of at least one vinylaromatic monomer and at least one methyl (meth) acrylate-based monomer. Optionally, further monomers may be comprised, such as an aliphatic vinyl. Preferably, the vinylaromatic monomer is a styrene-based monomer, in particular styrene. Preferably, the aliphatic vinyl is acrylonitrile.

In another preferred embodiment, component A is a styrene methyl methacrylate (SMMA) resin. The SMMA resin may have any monomer moiety composition mainly composed of styrene and methyl methacrylate moieties. The SMMA resin (component A) comprises at least 50% by weight, preferably 55 to 95% by weight, more preferably 60 to 85% by weight, and even more preferably 65 to 75% by weight, based on the weight of component A, of a vinylaromatic monomer, preferably styrene and/or α-methylstyrene. Further, component A comprises less than 50% by weight, preferably 5 to 45% by weight, more preferably 15 to 40% by weight, and even more preferably 25 to 35% by weight, based on the weight of component A, of methyl methacrylate. The SMMA may be a random polymer or a block polymer. In a preferred embodiment, the at least one SMMA resin is a random polymer.

In particular, commercial available SMMA can be used, such as NAS® types from Styrolution (Frankfurt, Germany), such as NAS® 30, NAS® 90, and NAS® 21.

In another preferred embodiment, component A is selected from the group consisting of styrene butadiene copolymer (SBC), styrene maleimide copolymer (SMC), methyl methacrylate acrylonitrile butadiene styrene (MABS), styrene α-methylstyrene copolymer and mixtures of two or more thereof or mixtures of SMMA with impact modified types such as methyl methacrylate-butadiene-styrene (MBS).

Component B

Component B is present in the styrene copolymer composition in an amount of 0.05 to 10% by weight, preferably of 0.1 to 5% by weight, more preferably of 0.1 to 2% by weight, even more preferably of 0.1 to 1% by weight, in particular of 0.05 to 1% by weight, based on the weight of all components A to C of the styrene copolymer composition.

Component B is prepared from 60 to 100% by weight, preferable from 80 to 100% by weight, based on the weight of component B, of at least one methyl methacrylate-based or at least one butyl methacrylate-based monomer. Preferably, component B is a methyl methacrylate-based polymer, which is prepared from at least 60% by weight, more preferably from at least 70% by weight, even more preferably from more than 80% by weight, and in particular from more than 90% by weight, based on the weight of component B, of methyl methacrylate.

Component B may further comprise vinylaromatic monomers, such as styrene, α-methylstyrene, or aliphatic vinyl monomers such as butadiene, which may be present from 0 to 40% by weight, preferably from 0 to 30% by weight, and more preferably from 0 to 20% by weight, based on the weight of component B.

In a preferred embodiment, component B is a cross-linked polymer. Suitable cross-linking agents are selected but not limiting from ethylene glycol diacrylate, di(ethylene glycol) diacrylate, tetra(ethylene glycol) diacrylate, ethylene glycol dimethacrylate, di(ethylene glycol) dimethacrylate, tri(ethylene glycol) dimethacrylate, N,N'-methylenebisacrylamide, N,N'-(1,2-dihydroxyethylene)bisacrylamide, N-(1-hydroxy-2,2-dimethoxyethyl)acrylamide, and divinylbenzene. Preferably, component B comprises less than 2.5% by weight, more preferably less than 1.5% by weight, even more preferably less than 1% by weight, and in particular less than 0.8% by weight, based on the weight of component B, of a cross-linking agent.

The pH value of component B is between 5 and 8, preferably between 5.5 and 7.5. Preferably, component B contains less than 4% by weight, more preferably less than 3% by weight, even more preferably less than 2% by weight, and in particular less than 1% by weight, based on the weight of component B, of residual monomers.

The average particle diameter of the polymer beads of component B is from 0.1 to 30 μm, preferably from 0.5 to 20 μm, more preferably from 0.7 to 18 μm, and even more preferably from 0.8 to 12 μm.

Typically, component B has a particle size distribution, wherein the coefficient of variation (CV value) is from 10 to 50%, preferably from 15 to 45%, and more preferably from 15 to 40%. In another preferred embodiment, the CV value of component B is from 7 to 15%. The CV may exemplarily be determined to ISO 13320:2009. Alternatively, the CV may be obtained by dividing the standard deviation by the average particle size, wherein the Particle Size Distribution (PSD) is measured using a Coulter counter made by Beckman Coulter.

In a preferred embodiment, component B has a refractive index from 1.30 to 1.60, preferably from 1.34 to 1.55, more preferably from 1.38 to 1.53, and even more preferably from 1.40 to 1.51, determined to ISO 489:1999.

In another preferred embodiment, component B comprises at least two different types of cross-linked copolymer beads as light diffuser component B. The different light diffusers can have equal or different average particle diameters and equal or different refractive indices.

In one preferred embodiment, the different types of light diffusers have different average particle diameters, wherein the one light diffuser bead B1 has an average particle diameter from 0.5 to 5 μm and a second light diffuser bead B2 has an average particle diameter from greater than 5.1 to 10 μm.

The types of light diffuser beads B1 and B2 are applied in a ratio (B1:B2) from 1:10 to 10:1, preferably from 1:7 to 7:1, more preferably from 1:5 to 5:1, and even more preferably from 1:3 to 3:1.

Optionally, further types of light diffuser beads B3 and/or B4, having an average particle size equal or different to light diffuser B1, B2 and to each other, may be added to the composition of component B. Preferably, light diffuser bead B3 has an average particle diameter from 0.1 to 15 μm, with the proviso that the average particle diameter is different to the average particle diameter of light diffusers B1, B2, and B4. In another preferred embodiment, light diffuser bead B4 has an average particle diameter from 0.1 to 15 μm, with the proviso that the average particle diameter is different to the average particle diameter of light diffusers B1, B2, and B3.

In one preferred embodiment, the different types of light diffusers have different refractive indices, wherein the one light diffuser bead B1' has a refractive index from 1.3 to 1.45 and a second light diffuser bead B2' has a refractive index from 1.46 to 1.6. Preferably, the one light diffuser bead B1' has a refractive index from 1.32 to 1.45 and a second light diffuser bead B2' has a refractive index from 1.46 to 1.58. More preferably, the one light diffuser bead B1' has a refractive index from 1.34 to 1.45 and a second light diffuser bead B2' has a refractive index from 1.46 to 1.55.

The light diffuser beads B1' and B2' are applied in a ratio (B1':62') from 1:10 to 10:1, preferably from 1:7 to 7:1, more preferably from 1:5 to 5:1, and even more preferably from 1:3 to 3:1.

Optionally, further light diffuser bead B3' and/or B4', having a refractive index equal or different to light diffuser B1', B2' and to each other, may be added to the composition of component B. Preferably, light diffuser bead B3' has a refractive index from 1.3 to 1.6, with the proviso that the refractive index is different to the refractive index of light diffusers B1', B2', and B4'. In another preferred embodiment, light diffuser bead B4' has a refractive index from 1.3 to 1.6, with the proviso that the refractive index is different to the refractive index of light diffusers B1', B2', and B3'.

The polymer beads of component B may be prepared by techniques known in the art, such as emulsion polymerization, solution polymerization, suspension polymerization, and bulk polymerization, wherein the polymerization is preferably initiated radically. However, anionic polymerization may also be possible.

Component C

Component C is, if present, at least one additive, which is different to components A and B, present in the styrene copolymer composition in an amount of 0 to 49.95% by weight, preferably of 0 to 39.9% by weight, more preferably of 0 to 29.9% by weight, even more preferably of 0 to 19.8% by weight, often of 0.1 to 19.8% by weight (and in particular of 0 to 14.5% by weight, often of 0.1 to 14.5% by weight), based on the weight of all components A to C of the styrene copolymer composition.

The additive component C may be a polymer additive in the broadest sense or may be a non-polymer-like additive. Preferably, the component C, as used herein, is not a polymer.

Preferably, component C has either a wax/talcum-like appearance at normal conditions (20° C., 1013 mbar, no addition of solvents) and/or a molecular weight of not more than 5 kDa, in particular not more than 1 KDa. The component C may be any additive known for plastics in the art. These are exemplarily a processing aids (e.g. emulators, polymerization initiators, puffer substances, conventional dispersing agents, such as low-molecular-weight waxes, e.g. polyethylene waxes, or stearates, such as magnesium stearate or calcium stearate), a plasticizer, a glossing agent, an antioxidant, a metal deactivator, an antistatic agent, a flow agent, an anti-sticking agent, metal ions, fatty acids, pigments, dyes, flame retardant additives, reinforcing agents, such as glass filaments or fibers, a filling agent (magnesium carbonate (chalk), astonite, talcum, calcium carbonate, one or more silicate(s), titan dioxide, zinc oxide, graphite, grapheme, glass particle(s), carbon nanotubes, aluminum oxide), and stabilizers, such as light stabilizer (e.g., an UV-absorber), a process stabilizer, or a radical scavenger, and a phenolic primary stabilizer. Often, an inorganic filler (such as $BaSO_4$), e.g. in an amount of 0.1 to 14.5% by weight, is used.

Suitable antioxidants are sterically hindered mono- or polynuclear phenolic antioxidants, which may be substituted in various ways and also bridged via substituents.

These include not only monomeric but also oligomeric compounds, which may be built up from more than one fundamental phenol unit. Hydroquinones and substituted compounds which are hydroquinone analogs are also suitable, as are antioxidants based 20 on tocopherols and their derivatives. Mixtures of different antioxidants may also be used. In principle, it is possible to use any compound which is commercially available or suitable for styrene copolymers, such as Topanol® or Irganox®.

Alongside the phenolic antioxidants mentioned as examples above, it is possible to use costabilizers, in particular phosphorus- or sulfur-containing costabilizers. Such phosphorus- or sulfur25 containing costablizers are known to the person skilled in the art and are commercially available.

Examples of suitable antistats are amine derivatives, such as N,N-bis(hydroxyalkyl)alkylamines or -alkyleneamines, polyethylene glycol esters, copolymers of ethylene glycol and propylene glycol, and glycerol mono- and distearates, and mixtures of these.

Pigments are composed of solid particles less than 100 µm, preferably less than 50 µm, more preferably less than 1 µm in diameter. Examples of pigments are titanium dioxide, zinc chromate, phthalocyanines, lithopone, ultramarine blue, iron oxides and carbon 5 black, and the entire class of organic pigments.

Examples of flame retardants are the halogen-, sulfur or phosphorus-containing compounds and/or mixtures thereof known to the person skilled in the art, magnesium hydroxide and other customary compounds or mixtures of these. Red phosphorus is also suitable.

Dyes are all dyes which can be used for the transparent, semitransparent or nontransparent coloration of polymers, in particular those which are suitable for coloration of styrene based copolymers. Dyes of this type are known to the person skilled in the art.

Further suitable particulate fillers are carbon black, amorphous silicic acid, powdered quartz, mica, bentonites, feldspar or in particular calcium silicates, such as wollastonite and kaolin.

Examples of suitable stabilizers to counter the action of light (UV-stabilizer) are various substituted resorcinols, salicylates, benzotriazoles, benzophenones and HALS (hindered amine light stabilizers), commercially available, for example, as Tinuvin®.

A component C as used herein may be added to the styrene copolymer composition on purpose or may result from the production process of either the polymer raw components and/or the blending process (e.g., as residual(s) from solvent(s), monomer(s), activator(s), precipitation and/or purification step(s), degradation products from monomer(s), activator(s) and/or other pyrolytic product(s)). The additive may be added upon blending the polymer raw components and/or may be comprised in one or more of the polymer raw component(s).

Process of Preparation

In a further aspect the present invention relates to a process for preparing a styrene copolymer composition as described above (styrene copolymer composition comprising component A, component B and optionally component C) comprising the step of mixing the polymer components A and B and optionally additive component C.

Preferably, further commonly known additives as component C can be used, in particular additives selected from stabilizers, antioxidants, anti-blocking agents, mold release agents (e.g. erucic acid amide, stearic acid amide), flow improvement additives (e.g. white oil such as mineral oil), extenders, dyes, pigments, flame-retardants, fillers, and reinforcing agents (e.g. glass fibers).

Typically, adequate mixing of the copolymer components of the copolymer composition of the invention can be achieved by mechanical mixing, preferably using a single screw or twin screw extruder. Operation of an extruder to achieve this end is within the purview of a person skilled in the art. For example, for an inch and a half extruder having an L to D ratio of about 30:1, the extruder is preferably operated from 75 to 125 rpm. During such operation, the barrel temperature of the extruder is in particular in the range of from 150 to 250° C., preferably from 200 to 250° C., and more preferably from 215 to 235° C.

Preferably, the extrusion speed is less than 80 kg/h, more preferably from 10 to 70 kg/h, even more preferably from 15 to 16 kg/h, and in particular from 25 to 30 kg/h. The residence time is less than 60 min, preferable 40 min or less, more preferably less than 30 min, even more preferably less than 20 min.

The components of the styrene copolymer composition may be individually fed to the extruder. Alternatively, they may be mixed together and then fed to the extruder, or mixed together and then extruded, and then optionally chopped into pellets. However, the components of the styrene copolymer composition of the present invention may also be dry-blended in, for example, a tumble blender. Said dry-blended styrene copolymer compositions can be used directly in a process for the production of articles, e.g. by extrusion, injection molding or blow molding. Further said dry-blended styrene copolymer composition can be extruded and the extruded styrene copolymer composition can be used in a process for the production of articles, e.g. by extrusion, injection molding or blow molding.

Other types of fabrication include press molding, transfer molding, pultrusion molding, filament winding, casting, centrifugal casting, continuous casting and slip forming.

Preferably, the styrene copolymer composition is manufactured by a process which comprises the steps:

(i) dispersing component B or a master batch comprising component B in the matrix component A and optionally adding component C, according to the invention, and (ii) heat treatment of a temperature of 150 to 250° C., and (iii) cooling the composition below the glass transition temperature (Tg) of the composition.

The styrene copolymer composition of the present invention can be used for the production of articles, e.g. moldings or foils, optionally by adding known additive components C, such as stabilizers, antioxidants, anti-blocking agents (e.g. erucic acid amide, stearic acid amide), mold release agents, flow improvement additives (e.g. white oil suc as mineral oil), extenders, dyes, pigments, flame-retardants, fillers, reinforcing agents (e.g. glass fibers). Typically the articles can be produced by extrusion, injection molding or blow molding.

In an alternative procedure, the polymers may be fed directly to an extruder using loss-in-weight feeders for accurate composition control. As is common for twin screw extrusion, some of the polymers may be accurately metered into the extruder downstream of the main feed zone.

Furthermore, the present invention relates to a molding comprising (or made of) a styrene copolymer composition as described above. The molding can be used in various fields of applications of transparent, in particular transparent polymer articles, e.g. the moldings can be a food container, displays, lightning covers, and components of toys.

Furthermore, the present invention relates to the use of a styrene copolymer composition as described above for the production of household items, electronic components, household equipment, garden equipment, medical-technology equipment, motor-vehicle components, and bodywork parts.

The styrene copolymer compositions according to the invention are preferably used for the manufacturing of a light diffusing plate, molding, or foil. Light diffusing plate, molding, or foil according to the invention may be applied in humid environment due to their limited sensitivity toward hydrolysis. Therefore, they are used at ships or in humid areas.

The invention is described in more detail in the following examples and claims.

EXAMPLES

Test Methods:

The optical parameters transmission and haze can be determined via a typical instrument such as Hunterlab Ultrascan Pro USP1159, having an optical geometry of 8°/d.

The Yellowness Index can determined to ASTM E313 via a white tile, wherein the illuminant is D65 and the observer angle is 10° and then calculated with the measured tristimulus values X, Y, and Z and the constants Cx and Cz at D65/10°:

$YI=100(CxX-CzZ)/Y$

The transmission can be determined to ASTM D1003.
The haze can be determined to ASTM D1003-95.
The differences (Δ) of the yellowness index (ΔYI) and the color shift (ΔE) between the immediate prepared copolymer and the same copolymer weathered for 26 h according to ISO 4892-3 as described above are determined.

The ΔYI can be determined to ASTM E313 with a datacolor spectral photometer 600.

The ΔE can be determined to DIN 5033-2 with a datacolor spectral photometer 600. Artificial weathering can be simulated according to ISO 4892-3 using a Q-UVse from Q-Lab (Lamp type UVA-340). This procedure includes repeating cycles of UV irradiance 0.76 W/m² at 60° C. for 8 h (step 1) and condensation at 50° C. for 4 h (step 2). In the context of the present invention, artificial weathering was conducted as indicated before for 26 h. This includes two complete cycles and one beginning cycle.

As a means of measuring the three-dimensional scattering characteristic of a material the diffusion factor (DF) can be used. The DF can be determined by Agfa Gevaert NV (Agfa Labs):

Relative BTDF (Bidirectional Transmission Distributed Function) measurements with a conoscope (EZContrast XL88) can be performed on the samples of examples 3 to 5 and comparative examples 3C and 4C:

Near 0° illumination with a collimated beam (<3° divergence—see instruments signature) can be used and the angular distribution of transmission (φ=0°-360°, Θ=0°-80° [88°]) was captured. Measurements can be performed with photopic ($V_\lambda$) response and a 300 micron measurement spot. The samples were moved during acquisition in order to average out the micro structure of the material. The obtained conograms are directly cos-corrected as size of the measurement spot increases with cos(Θ), i.e. a Lambertian surface appears "flat" in the conoscope measurement.

The average transmission into circular segments at 5, 20 and 70° can be derived ("B(theta)=I(theta)/cos(theta), wherein ((theta) is the intensity at theta +−2° and a 2° aperture was used for integration at 5, 20, 70°) for calculation of DF according to the definition DF=(B20+B70)/(2*B5). As comparison, a "near Lambertian" Spectrolon foil (Gigahertz 500 mm) was measured, having a DF of 88.8%.

The eccentricity can determined with a conoscope (EZ-Contrast XL88) by Agfa Labs.

The following components A(a,b), B(a-e) and C(a,b) as used are:

a) Polymer Matrices a are:

The component A-a as used herein is a styrene methyl methacrylate resin (SMMA) and was purchased from Styrolution as NAS® 30, having a Mw of 190 kDa (determined by GPC with UV-detector), a polydispersity index (PDI) of 2.6 (determined by GPC with UV-detector), and a light transmission of 91% (determined by ASTM D 1003 at 550 nm).

The component A-b as used herein is a styrene acrylonitrile resin (SAN) and was purchased from Styrolution (Frankfurt) as Luran® 348Ω Q42, having a Mw of 210 kDa (determined by GPC with UV-detector), a polydispersity index (PDI) of 2.5 (determined by GPC with UV-detector), and a light transmission of greater than 89% (determined by ASTM D 1003 at 550 nm).

b) The Polymer Beads Used as Component B are:

The component B-a as used herein is a cross-linked polymethyl methacrylate resin (PMMA) and was purchased from Sekisui Plastics Co., Ltd. (Sekisui) as BMSA-18GN, having an average particle diameter of 0.8 μm.

The component B-b as used herein is a cross-linked polymethyl methacrylate resin (PMMA) and was purchased from Sekisui as MBX-8, having an average particle diameter of 8 μm.

The component B-c as used herein is a cross-linked polymethyl methacrylate resin (PMMA) and was purchased from Sekisui as MFX-110BSD, having an average particle diameter of 10 μm.

The component B-d as used herein is a cross-linked polymethyl methacrylate resin (PMMA) and was purchased from Sekisui as MBX 2H, having an average particle diameter of 1.8 μm.

The component B-e as used herein is a cross-linked polymethyl methacrylate resin (PMMA) and was purchased from Sekisui as MFX 405 U, having an average particle diameter from 3 to 7 μm.

c) The Used Components C are:

The component C-a as used herein is ®Tinuvin P and was purchased from BASF (Ludwigshafen).

The component C-b as used herein is Tinuvin® 770 and was purchased from BASF.

d) Inorganic Light Diffusion Agents (for Comparative Examples) are:

The barium sulfate (BaSO$_4$) as used herein was purchased from Sachtleben as BLANC FIXE M (5 μm), K3 (8 μm), and K4 (10 μm).

The glass bubbles as used herein was purchased from 3M™ as iM16k (average diameter of 20 μm, determined by 3M QCM 193.0) and iM30K (average diameter of 17 μm, determined by 3M QCM 193.0).

Preparation of the Styrene Methyl Methacrylate Copolymer Compositions (Examples 1 to 5) and the Styrene Acrylonitrile Compositions (Examples 6 to 9):

Components A(a,b), B(a-e), and optionally C(a,b) were compounded in accordance with the amounts given in Table 1 and Table 5 to give copolymer compositions according to examples 1 to 9.

The components were mixed at a melt temperature of from 220 to 250° C. in a twin-screw extruder at a speed of 25 to 30 kg/h. The melt was injected into suitable preforms to obtain step plates 75×50×1 mm (pre drying 4 h/80° C., WT 70° C., MT 240-250° C.).

The comparative example 1 (1C) is a thermoplastic molding based on polymethyl methacrylate and is commercially available from Dow Chemical as ACRYLITE® Satinice zd23.

The comparative example 2 (2C) is a thermoplastic molding based on polymethyl methacrylate and is commercially available from Dow Chemical as ACRYLITE® Satinice df23 8N. The comparative example 3 (3C) is a thermoplastic molding based on polymethyl methacrylate and was purchased from Lucite International as Diakon® Frost 902-70. The comparative example 4 (4C) is a thermoplastic molding based on polymethyl methacrylate and was purchased from Lucite International as Diakon® Frost 902-80.

Preparation of the Comparative Styrene Methyl Methacrylate Copolymer Compositions (Examples 5C to 16C):

Component A-a and barium sulfate or other inorganic fillers were compounded in accordance with the amounts given in Table 3 and Table 4 to give copolymer compositions according to examples 5C to 16C.

The components were mixed at a melt temperature of from 220 to 250° C. in a twin-screw extruder at a speed of 25 to 30 kg/h. The melt was injected into suitable preforms to obtain step plates 75×50×1 mm (pre drying 4 h/80° C., WT 70° C., MT 240-250° C.).

TABLE 1

Styrene copolymer compositions according the invention.

| Example | 1 | 2 | 3 | 4 | 5 |
|---|---|---|---|---|---|
| Component A-a [% wt] | 99 | 99 | 98 | 99 | 99 |
| Component B-a [% wt] | 0.1 | | | | |
| Component B-b [% wt] | 0.9 | | | | |
| Component B-c [% wt] | | 0.5 | | | |
| Component B-d [% wt] | | 0.5 | | 0.5 | 0.75 |
| Component B-e [% wt] | | | 2 | 0.5 | 0.25 |
| Transmission [%] | 85.3 | 85 | 81.3 | 85.6 | 85.1 |
| Haze [%] | 90.5 | 91.4 | 97.8 | 94.7 | 95.0 |
| Yellowness Index (YI) | 1.41 | 2.19 | 4.23 | 2.02 | 2.17 |
| Diffusion factor [%] | n.m. | n.m. | 40.0 | 20.9 | 17.5 |
| Eccentricity | n.m. | n.m. | 1.01 | 1.07 | 1.10 |

The compositions have improved yellowness indices (YI) and high diffusion factor;
n.m. = not measured;
% wt = % by weight.

In Table 1 it is shown, that the optical properties of the molding compositions according to the invention are well balanced. The transmission is always greater than 81%, the haze is always greater than 90%, the Yellowness Index is always smaller than 4.5 and the diffusion factor is always greater than 17%. The sum of the transmission and the haze is always greater than 175, wherein either the haze is greater than or equal to 83% or the transmission is greater than or equal to 93%, or both.

TABLE 2

Known thermoplastic moldings.

| Comp. example | 1C* | 2C* | 3C | 4C |
|---|---|---|---|---|
| Transmission [%] | 85 | 86 | 86 | 85 |
| Haze [%] | 96 | 96 | 75 | 75 |
| Yellowness Index (YI) | 5.5 | <6.5 | n.m. | n.m. |
| Diffusion factor [%] | n.m. | n.m. | 5.0 | 6.5 |

The compositions have good transmission and haze but higher Yellowness Indices and/or lower diffusion factors;
n.m. = not measured;
* = values from data sheet.

In Table 2 it is shown, that the optical properties of known molding compositions (acrylic polymer compositions 10 and 2C) have a transmission greater than 84% and a haze greater than 95%. However, the Yellowness Index (YI) is greater than 4.5. Therefore, the optical properties are not as balanced as according to the present invention (compare Table 1). Further, the known in the art molding polymethyl methacrylate (PMMA) compositions 3C and 4C show a transmission greater than 84%, however the haze and the diffusion factor of the styrene copolymer compositions according to the invention are superior (compare Table 1).

TABLE 3

Styrene copolymer compositions with barium sulfate

|  | Comp. example | | | | | |
|---|---|---|---|---|---|---|
|  | 5C | 6C | 7C | 8C | 9C | 10C |
| Component A-a [% wt] | 99 | 99 | 99 | 95 | 95 | 95 |
| BaSO₄ M [% wt] | 1 |  |  | 5 |  |  |
| BaSO₄ K3 [% wt] |  | 1 |  |  | 5 |  |
| BaSO₄ K4 [% wt] |  |  | 1 |  |  | 5 |
| Transmission [%] | 85 | 86 | 86 | 82 | 83 | 83 |
| Haze [%] | 44 | 47 | 44 | 90 | 89 | 88 |
| Yellowness Index (YI) | 1.73 | 1.21 | 0.94 | 1.78 | 1.44 | 1.27 |

% wt = % by weight

The compositions with barium sulfate have a low yellowness indices (YI) and high transmission but a lower haze; the haze increases by the amount of barium sulfate.

Table 3 demonstrates that the use of barium sulfate does give compositions having a low YI however the haze is very low if barium sulfate is applied with 1% by weight (compositions 5C to 7C). A transmission of around 80% and a haze of up to 90% are not achieved before using 5% by weight of barium sulfate (compositions 8C to 100).

TABLE 4

Styrene copolymer compositions with other inorganic filler

|  | Comp. example | | | | | |
|---|---|---|---|---|---|---|
|  | 11C | 12C | 13C | 14C | 15C | 16C |
| Component A-a [% wt] | 99 | 99 | 99.5 | 99.5 | 98 | 98 |
| iM16k [% wt] | 1 |  | 0.5 |  | 2 |  |
| iM30K [% wt] |  | 1 |  | 0.5 |  | 2 |
| Transmission [%] | 78 | 75 | 83 | 82 | 68 | 62 |
| Haze [%] | 45 | 60 | 23 | 25 | 82 | 91 |
| Yellowness Index (YI) | 1.74 | 1.61 | 1.87 | 1.64 | 1.90 | 1.68 |

% wt = % by weight

The compositions have low yellowness indices (YI) and unbalanced transmission and haze.

In Table 4 it is shown that the use of glass bubbles gives compositions having a low YI but also a low haze. The transmission decreases with the amount of glass bubbles (compare transmissions: 13C>110>16C and 14C>12C>16C), wherein the haze increases with the amount of glass bubbles (compare haze: 13C<11C<16C and 14C<12C<16C). Therefore, the optical properties of glass bubble containing compositions are not balanced.

TABLE 5

Styrene copolymer compositions comprising a mixture of components B and light stabilizer (component C), wherein ΔYI and ΔE are improved.

| Example | 6 | 7 | 8 | 9 |
|---|---|---|---|---|
| Component A-b [% wt] | 99 | 99 | 98.849 | 98.6 |
| Component B-c [% wt] |  |  | 0.188 | 0.25 |
| Component B-d [% wt] | 0.5 | 0.25 | 0.563 | 0.75 |
| Component B-e [% wt] | 0.5 | 0.75 |  |  |
| Component C-a [% wt] |  |  | 0.2 | 0.2 |
| Component C-b [% wt] |  |  | 0.2 | 0.2 |
| Δ Yellowness Index (ΔYI)* | n.m. | n.m. | −8 | −8 |
| Δ color shift (ΔE)* | n.m. | n.m. | 4 | 4 |
| Transmission [%] | 82 | 83 | 83 | 82 |
| Haze [%] | 96 | 96 | 93 | 96 |

TABLE 5-continued

Styrene copolymer compositions comprising a mixture of components B and light stabilizer (component C), wherein ΔYI and ΔE are improved.

| Example | 6 | 7 | 8 | 9 |
|---|---|---|---|---|
| Yellowness Index (YI) | 4.02 | 3.43 | 3.14 | 3.58 |
| Diffusion factor [%] | 27.1 | 25.7 | 16.0 | 23.7 |
| eccentricity | 1.04 | 1.07 | 1.03 | 1.03 |

*The Δ values show the differences between the immediate prepared copolymer and the same copolymer weathered for 26 h according to ISO 4892-3 as described above, i.e., the effect of the weathering procedure.
n.m. = not measured;
% wt = % by weight.

In Table 5 it is shown, that the optical properties of the SAN molding compositions according to the invention are well balanced. The transmission is always greater than 81%, the haze is always greater than 90%, the Yellowness Index is always smaller than 4.5 and the diffusion factor is always greater than 15%. The sum of the transmission and the haze is always greater than 175, wherein either the haze is greater than or equal to 83% or the transmission is greater than or equal to 93%.

Further, Table 5 shows improved ΔYI and ΔE values for the compositions containing UV stabilizer (examples 8 and 9). Examples 8 and 9 show only a minor color shift ΔE of less than 4 upon artificial weathering according to ISO 4892-3 after 26 days. Further a blue shift is observed upon UV irradiation (ISO 4892-3 after 26 days), rather than a yellow shift (ΔYI is negative).

The invention claimed is:

1. A styrene copolymer composition comprising:
   a) 60 to 99.9% by weight of at least one styrene copolymer as matrix component A,
   b) 0.1 to 5% by weight of at least one type of PMMA-based, cross-linked copolymer beads as light diffuser component B, wherein the polymer beads have an average particle diameter from 0.5 to 20 µm and a refractive index ranging from 1.34 to 1.55,
      wherein the light diffuser component B comprises at least two different types of light diffuser beads B1 and B2 with a different average particle size in a mass ratio B1:132 in the range of from 1:10 to 10:1, and
      wherein the light diffuser compound B contains less than 2.5% by weight, based on the weight of component B, of a cross-linking agent; and
   c) 0 to 39.9% by weight of at least one further component C which is different to A and B,
      wherein the sum of components A to C is 100% by weight, and wherein the styrene copolymer composition exhibits a light transmittance (determined by ASTM D1003) of greater than 80%, a haze (determined by ASTM D1003-95) of greater than 90%, and a yellowness index (determined by ASTM E313) of less than 4.5.

2. A styrene copolymer composition according to claim 1, wherein the matrix component A is based on styrene acrylonitrile (SAN), styrene methyl methacrylate (SMMA), or a mixture thereof.

3. A styrene copolymer composition according to claim 1, comprising 0.1 to 2% by weight, based on the weight of all components A to C, of at least one light diffuser component B.

4. A styrene copolymer composition according to claim 1, wherein the light diffuser component B is prepared from at least 80% by weight of methyl methacrylate (MMA).

5. A styrene copolymer composition according to claim 1, wherein the polymer beads of component B have an average particle diameter between 0.8 and 12 μm.

6. A styrene copolymer composition according to claim 1, wherein the first type light diffuser beads B1 has an average particle diameter from 0.8 to 5 μm, the second type light diffuser beads B2 has an average particle diameter from 5.1 to 10 μm, and optionally a further type of light diffuser beads B3 has an average particle diameter different to B1 and B2.

7. A styrene copolymer composition according to claim 1, wherein at least two different light diffuser beads with a different refractive index are used as light diffuser component B.

8. A styrene copolymer composition according to claim 7, wherein the first type of light diffuser beads B1' has a refractive index from 1.34 to 1.45, the second type of light diffuser beads B2' has a refractive index from 1.46 to 1.55, and optionally a further type of light diffuser beads B3' has a refractive index different to B1' and B2'.

9. A styrene copolymer composition according to claim 1, wherein at least two different types of light diffuser beads B with different average particle diameters and different refractive indices are used.

10. A styrene copolymer composition according to claim 1, wherein the light transmittance of the styrene copolymer composition is greater or equal to than 83% and/or the haze is greater than or equal to 93%.

11. A process for the preparation of a styrene copolymer composition of claim 1,
wherein the process comprises the steps of:
(i) dispersing component B or a master batch comprising component B in the matrix component A and optionally adding component C,
(ii) heat treatment with a temperature of 150 to 250° C., and
(iii) cooling the styrene copolymer composition below the glass transition temperature (Tg) of the composition.

12. A light diffusing plate, molding, or foil comprising a styrene copolymer composition according to claim 1.

13. A styrene copolymer composition according to claim 1, wherein the styrene copolymer composition comprises 0.1 to 19.8% by weight of at least one further component C.

* * * * *